United States Patent
Fontalbat et al.

(10) Patent No.: US 12,024,142 B2
(45) Date of Patent: Jul. 2, 2024

(54) SYSTEM AND METHOD FOR COOLING THE BRAKES OF LANDING GEAR OF AN AIRCRAFT

(71) Applicant: SAFRAN ELECTRICAL & POWER, Blagnac (FR)

(72) Inventors: Thierry Fontalbat, Blagnac (FR); Florent Challas, Blagnac (FR); Fabien Orlandini, Blagnac (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 550 days.

(21) Appl. No.: 17/283,302

(22) PCT Filed: Oct. 2, 2019

(86) PCT No.: PCT/FR2019/052335
§ 371 (c)(1),
(2) Date: Apr. 7, 2021

(87) PCT Pub. No.: WO2020/074805
PCT Pub. Date: Apr. 16, 2020

(65) Prior Publication Data
US 2021/0387606 A1 Dec. 16, 2021

(30) Foreign Application Priority Data
Oct. 10, 2018 (FR) ...................................... 1859378

(51) Int. Cl.
*F16D 55/02* (2006.01)
*B60T 17/02* (2006.01)
(Continued)

(52) U.S. Cl.
CPC ............ *B60T 17/02* (2013.01); *F16D 65/807* (2013.01); *F16D 65/847* (2013.01);
(Continued)

(58) Field of Classification Search
CPC ............ F16D 65/847; F16D 2065/787; F16D 2065/786; B60T 17/02
See application file for complete search history.

(56) References Cited

U.S. PATENT DOCUMENTS 3,251,437 A * 5/1966 Moyer .................... F16D 55/40
188/264 AA
3,664,467 A * 5/1972 Lucien .................. F16D 65/847
188/71.6
(Continued)

FOREIGN PATENT DOCUMENTS

CN 101903222 A 12/2010
GB 2533476 A 6/2016
(Continued)

OTHER PUBLICATIONS

Written Opinion of the International Searching Authority mailed Jan. 31, 2020, issued in corresponding International Application No. PCT/FR2019/052335, filed Oct. 2, 2019, 5 pages.
(Continued)

*Primary Examiner* — Nicholas J Lane
(74) *Attorney, Agent, or Firm* — Christensen O'Connor Johnson Kindness PLLC

(57) ABSTRACT

A system for cooling the brakes of a brake system of a landing gear of an aircraft, including: a compressor configured to generate a pressurized airflow, the compressor including at least one air outlet, and an air jet pump including: a pump tube including a first end connected to the air outlet and a second end, the pump tube being designed to carry the pressurized airflow between the first and second ends, and a plurality of injectors connected to the second end of the pump tube, and configured to inject the pressurized airflow.

12 Claims, 2 Drawing Sheets

(51) Int. Cl.
*F16D 65/807* (2006.01)
*F16D 65/847* (2006.01)
*F16D 65/02* (2006.01)
*F16D 65/78* (2006.01)

(52) U.S. Cl.
CPC ... *B60Y 2200/51* (2013.01); *F16D 2065/1328* (2013.01); *F16D 2065/787* (2013.01)

(56) References Cited

U.S. PATENT DOCUMENTS

| | | | | |
|---|---|---|---|---|
| 6,357,563 | B1* | 3/2002 | Hayford | F16D 65/847 188/71.6 |
| 11,441,628 | B2* | 9/2022 | Ganesh | B64C 25/42 |
| 11,466,742 | B2* | 10/2022 | Kirkbride | F16D 65/853 |
| 11,518,501 | B2* | 12/2022 | She | F16D 65/847 |
| 2010/0258385 | A1* | 10/2010 | Sabelstrom | F16D 65/78 188/71.6 |
| 2014/0239121 | A1* | 8/2014 | Kirkbride | B64C 25/42 137/1 |
| 2015/0097078 | A1* | 4/2015 | Mueller | B64C 25/42 244/50 |
| 2015/0266566 | A1 | 9/2015 | Ivandaev | |
| 2020/0124123 | A1* | 4/2020 | Elogab | B60T 17/002 |
| 2022/0042565 | A1* | 2/2022 | Nagaraja | B64C 25/42 |
| 2022/0135008 | A1* | 5/2022 | Ke | B60T 5/00 188/264 R |

FOREIGN PATENT DOCUMENTS

| | | |
|---|---|---|
| WO | 2009/082273 A1 | 7/2009 |
| WO | 2016/097735 A1 | 6/2016 |

OTHER PUBLICATIONS

International Preliminary Report on Patentability mailed Apr. 8, 2021, issued in corresponding International Application No. PCT/FR2019/052335, filed Oct. 2, 2019, 1 page.

Office Action issued in corresponding Chinese Patent Application No. 201980066539.8, 5 pages.

International Search Report mailed Jan. 31, 2020, issued in corresponding International Application No. PCT/FR2019/052335, filed Oct. 2, 2019, 2 pages.

Written Opinion of the International Searching Authority mailed Jan. 31, 2020, issued in corresponding International Application No. PCT/FR2019/052335, filed Oct. 2, 2019, 6 pages.

* cited by examiner

SYSTEM AND METHOD FOR COOLING THE BRAKES OF LANDING GEAR OF AN AIRCRAFT

TECHNICAL FIELD

The invention relates to a system and a method for cooling the brakes of a brake system of a landing gear of an aircraft.

The invention also relates to a landing gear of an aircraft comprising a brake system and a system for cooling the brakes of said brake system.

BACKGROUND

The prior art comprises in particular the documents GB-A-2 533 476 and US-A1-2015/266566.

In a known manner, an aircraft is provided with a brake system arranged at the main landing gear of the aircraft and comprising brakes configured to slow down and then stop the wheels of the main landing gear.

In operation, as the brakes heat up, it is necessary to cool them. To achieve this, a ventilation system of the brakes is mounted on the main landing gear at the axle of the wheels.

Such a ventilation system is shown in FIG. 1, for example, and comprises a fan 4 (BCF, acronym for "Brake Cooling Fan") on the outer side of the rim 1 which is configured to suck in an air flow from the outlet of the brakes 2, represented by the arrows F, when said brakes 2 are activated to slow down and then stop the wheel 3 of the main landing gear, and also during the stopping phase at the boarding gate. Thus, the BCF fan allows the brakes 2 to be cooled, as long as they are at a temperature above 300° C. During this phase, the temperature of the air sucked in can reach 170° C. However, a BCF fan is bulky, which causes space problems in the main landing gear of the aircraft.

Therefore, there is a need for a system that allows the cooling of the brakes of a brake system of landing gear of an aircraft, while reducing the weight and dimensions of such a system within the aircraft.

In particular, the present invention aims to provide a simple, economical and effective solution to these problems, avoiding the disadvantages of the known technique.

OBJECTIVE OF THE INVENTION

The objective of the present invention is to provide a system and a method for cooling the brakes of a brake system of landing gear of an aircraft.

SUMMARY OF THE INVENTION

To this end, the invention relates to a system for cooling the brakes of a brake system of a landing gear of an aircraft, comprising:
- a compressor configured to generate a pressurized air flow, said compressor comprising at least one air outlet, and
- an air jet pump comprising:
  - a pump tube comprising a first end connected to said air outlet and a second end, said pump tube being designed to convey said pressurized air flow between the first and second ends, and
  - a plurality of injectors connected to said second end of the pump tube, and configured to inject said pressurized air flow.

In particular, the injectors may be arranged in an area near the brakes and configured to inject a pressurized air flow into the area near the brakes when the cooling system is installed in a landing gear.

Advantageously, the cooling system according to the invention solves the space problem of the system for cooling the brakes of the landing gear of the aircraft according to the prior art. In particular, the cooling system according to the invention advantageously allows to perform the function of the BCF fan of the prior art to cool the brakes while reducing the dimensions and the weight in relation to the latter.

During operation of the cooling system, the compressor generates a pressurized air flow. The pressure of the air flow generated by the compressor is converted into a high velocity of the air flow in the injectors at the second end of said pump tube. At the outlet of the air jet pump, the high velocity of the air flow creates a low static pressure in the air ejection area, i.e. in the area near the brakes, which will force the displacement of the hot air coming from the brakes, and thus allow a suction of the air flow coming from the brakes. Thus, the cooling system according to the invention allows the high temperature air flow (about 170° C.) coming from the brakes towards the outside to be sucked, thus cooling them. According to the invention, it is therefore the additional flow rate generated by the injectors that allows the brakes to be cooled (by the venturi effect), and not directly the pressurized air flow emitted by the compressor.

The compressor is configured to suck in the air from outside the cooling system.

Preferably, during the installation, the compressor is arranged remotely from the area near the brakes. In other words, the compressor may be moved from the area near the brakes, i.e. moved from the heating area of the brakes.

The compressor may be an impeller, bearing, vane, screw or piston compressor.

The compressor may be an electric compressor.

The compressor may be configured to generate a pressurized air flow at a variable flow rate.

The compressor may be configured to generate a pressurized air flow. In particular, the compressor may be configured to generate a high pressure air flow.

The cross-section of the pump tube may be circular, or oval, or polygonal, or annular or any other shape.

The high velocity of the air flow creates a negative pressure near the heating area of the brakes.

The pump tube may comprise a plurality of injectors, preferably arranged in an area near the brakes when the cooling system is installed in a landing gear. In other words, the pump tube may comprise a plurality of injectors arranged near the heating area of the brakes.

The plurality of injectors may be arranged circumferentially and centred on the second end of the pump tube.

The plurality of injectors may comprise a central injector arranged as an extension of the second end of the pump tube and a plurality of intermediate injectors arranged 360° around said central injector.

The plurality of injectors may also comprise a plurality of external injectors arranged 360° around said intermediate injectors.

The plurality of external injectors and the plurality of intermediate injectors are in a staggered pattern around the second end of the pump tube.

One or each injector and/or the pump tube may be elbow-shaped. In particular, the plurality of intermediate injectors and/or the plurality of external injectors may be elbow shaped.

The plurality of injectors may comprise a first portion extending substantially perpendicular to the second end of the pump tube and a second portion extending substantially parallel to the second end of the pump tube.

The internal cross-section of one or each injector may be circular, or oval, or polygonal, or any other shape.

The internal cross-section of one or each injector may vary along the path of the pressurized air flow. Advantageously, the variation in the internal cross-section of the injectors allows the speed of the air flow at the outlet of the air jet pump to be increased. In particular, the variation in cross-section between the injectors and the pump tube allows a local increase of the air velocity which generates a static pressure depression.

One or each injector may have a cross-sectional restriction along the path of the pressurized air flow. In particular, the cross-sectional restriction allows the velocity of the air flow at the outlet of one or each injector to be increased.

Preferably, the cross-sectional variations of one or each injector are continuous.

According to a first embodiment, the second end of the pump tube is arranged on the outer side of a rim of the wheel.

According to a second embodiment, the second end of the pump tube is arranged on the inner side of a rim of the wheel.

The invention also relates to a landing gear of an aircraft comprising:
- at least one wheel, and
- a brake system comprising brakes adapted to slow down or stop the rotation of said at least one wheel,
  wherein it also comprises a cooling system according to the invention.

The system for cooling the brakes provides a ventilation of the brakes, which advantageously reduces the turnaround time of the aircraft.

The landing gear of the aircraft may be the main landing gear of the aircraft.

The landing gear may comprise an traction electric motor of the aircraft, which is configured to drive the wheel or the wheels of the landing gear in rotation. In this case, the system for cooling the brakes according to the invention may also cool the traction electric motor of the aircraft. Thus, the cooling system according to the invention can cool both the brakes and the traction electric motor of the aircraft. In particular, it is the combination of the outside air, the pressurized air from the compressor and the pressurized air from the injectors that allows the traction electric motor of the aircraft to be cooled.

According to a first embodiment, each injector is arranged on the outer side of a rim of the wheel. In other words, each injector is arranged on the outside of a rim of the wheel.

According to a second embodiment, each injector is arranged on the inner side of a rim of the wheel. In other words, each injector is arranged inside a rim of the wheel (20).

The invention further relates to a method for cooling the brakes of a brake system of landing gear of an aircraft according to the invention, comprising the steps of:
- compressing, by means of the compressor, an air flow so as to generate a pressurized air flow,
- conveying the pressurized air flow, by means of the pump tube, to an area near the brakes,
- injecting, by means of each injector, the pressurized air flow into said area near the brakes, and
- sucking an air flow from said area near the brakes.

In particular, the injection of the pressurized air flow into the area near the brakes allows to generate a negative pressure in said area near the brakes.

The suction of the air flow from the area near the brakes results from the negative pressure generated in the area near the brakes.

For the purposes of the invention, the area near the brakes is defined as an area located at a distance between 0.2 m and 2.0 m from the brakes. In other words, the distance between the second end of the pump tube, and more precisely the injectors, and the brakes is between 0.2 m and 2.0 m.

The compression step may be a compression of an air flow so as to generate a low flow rate of air at high pressure.

DESCRIPTION OF FIGURES

The invention will be better understood and other details, features and advantages of the invention will become clearer on reading the following description made by way of non-limiting example and with reference to the annexed drawings in which.

DETAILED DESCRIPTION

Figure 1:
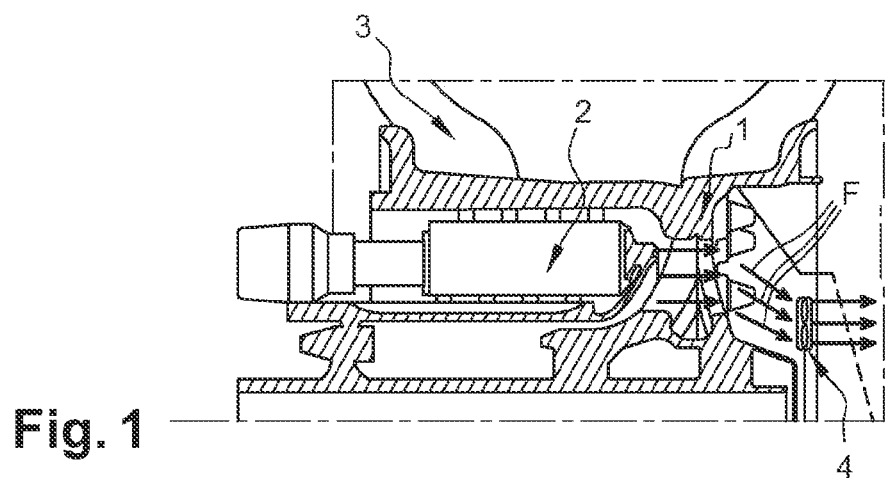
FIG. 1, described above, is a schematic cross-sectional view of a part of a landing gear of an aircraft according to the prior art.
Figure 2:
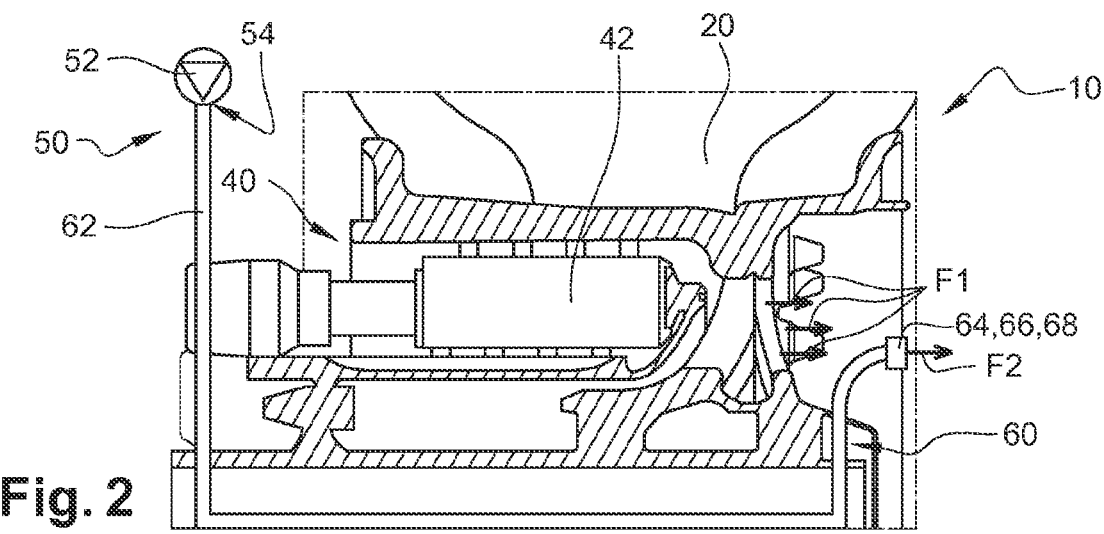
FIG. 2 is a schematic cross-sectional view of a part of a landing gear of an aircraft according to a first embodiment of the invention.
Figure 3:
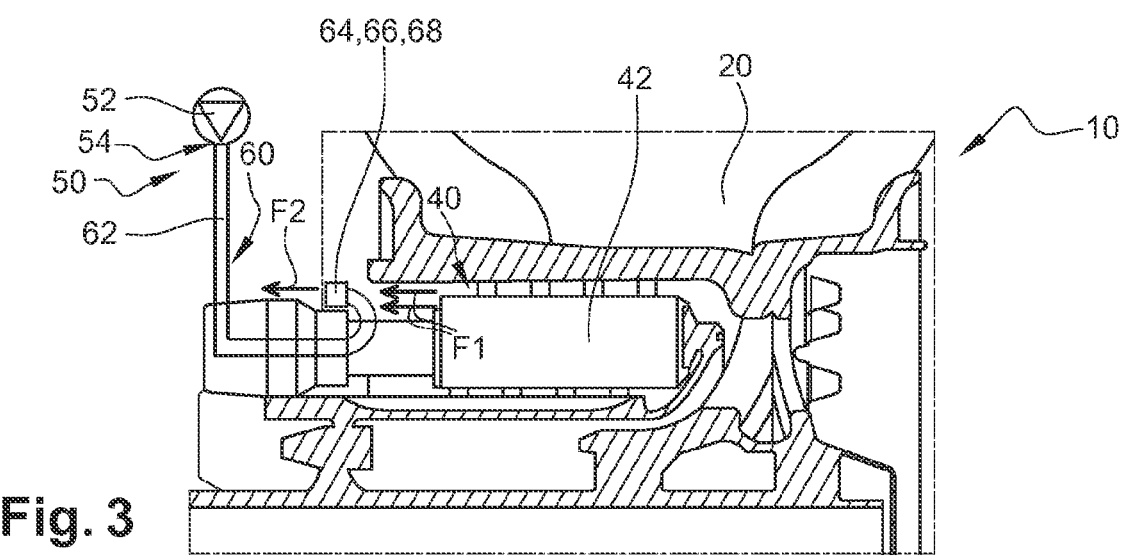
FIG. 3 is a schematic cross-sectional view of a part of a landing gear of an aircraft according to a second embodiment of the invention.

FIGS. 2 and 3 show a landing gear 10 of an aircraft according to the embodiments of the invention. The landing gear may be, for example, a main landing gear of an aircraft, and comprises at least one wheel 20 and a brake system 40.

The brake system 40 comprises brakes 42 adapted to slow and then stop the rotation of the wheel 20. The brakes 42 may be disc brakes, for example brakes made of carbon.

In operation, the brakes 42 heat up, so that an air flow F1 at high temperature, in particular between 150° C. and 200° C., for example at about 170° C., is generated at the brakes 42, and more precisely in an area known as near the brakes.

In general, a landing gear 10 comprises from two wheels to six wheels 20. The brake system 40 may then comprise brakes 42 arranged on each wheel 20.

The landing gear 10 also comprises a system 50 for cooling the brakes 42.

The cooling system 50 comprises a compressor 52 configured to generate a pressurized air flow, represented by the arrow F2. The compressor 52 comprises at least one air outlet 54.

The compressor 52 may be configured to generate a pressurized air flow F2 through the air outlet 54 at a low flow rate.

The compressor 52 may be configured to generate a pressurized air flow F2 through the air outlet 54 with a high pressure.

In other words, the compressor 52 is configured to generate an air flow F2 with a low flow rate and a high pressure.

The compressor 52 may be an impeller, bearing, vane, screw or piston compressor. The compressor 52 may be an electric compressor.

The compressor 52 is arranged at a distance from the area near the brakes 42. In other words, the compressor is remote from the area near the brakes 42.

The cooling system 50 also comprises an air jet pump 60.

The air jet pump 60 comprises a pump tube 62 and one or a plurality of injectors 64, 66, 68.

The pump tube 62 is a pipe, and comprises a first end connected to the air outlet 54 of the compressor 52 and a second end connected to the injectors 64, 66, 68.

The pump tube 62 is shaped to convey the pressurized air flow F2 between its first and second ends.

The cross-section of the pump tube 62 may be oval, or polygonal, or annular, or any or preferably circular.

The pump tube 62 may comprise at least one elbow. For example, in FIGS. 2 and 3, the pump tube 62 comprises three elbows.

The pump tube 62 is configured to convey the high pressure generated by the compressor 52 from the air outlet 54 to the injector 64, 66, 68.

The injectors 64, 66, 68 are arranged in the area near the brakes 42. Thus, the compressor 52 is fluidly connected to the area near the brakes 42 by the air jet pump 60.

The injectors 64, 66, 68 are configured to inject the pressurized air flow F2 into the area near the brakes 42.

The pressurized air flow F2 injected into the area near the brakes constitutes a primary air flow, and the air flow F1 from the brakes constitutes a secondary air flow. The flow rate of the primary air flow is lower than the flow rate of the secondary air flow, while the velocity of the primary air flow is higher than the velocity of the secondary air flow. In other words, the pressurized air flow F2 has a lower flow rate and higher velocity than the air flow F1 from the brakes.

At the outlet of the air jet pump 60, the high speed of the pressurized air flow F2 generates a negative pressure in the area near the brakes 42. This negative pressure causes the hot air from the brakes 42 to be sucked in. Indeed, the air flow F1 at high temperature (approximately 170° C.) coming from the brakes 42 is then sucked, which allows a cooling of the brakes 42. In other words, the primary air flow, injected with a high speed, will force the displacement of the secondary air flow, and drive said secondary flow out of the area near the brakes 42.

According to a first embodiment shown in FIG. 2, the second end of the pump tube 62 is arranged outside the rim of the wheel 20, with the air flow from the brakes flowing outwards.

In a second embodiment shown in FIG. 3, the second end of the pump tube 62 is arranged towards the inside of the rim of the wheel 20.

Figure 4:
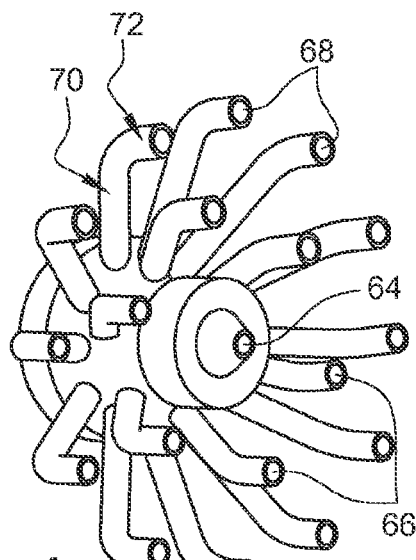
FIG. 4 is a schematic perspective view of a plurality of injectors of a cooling system according to the invention.

FIG. 4 shows a plurality of injectors 64, 66, 68.

The injectors may comprise a central injector 64 arranged as an extension of the second end of the pump tube 62, intermediate injectors 66 arranged 360° around the central injector 64 and external injectors 68 arranged 360° around the intermediate injectors 66. Of course, there may be only one injector, for example the central injector 64, or only the intermediate injectors 66 or external injectors 68, or only the central injector 64 and the intermediate injectors 66 or external injectors 68.

The injectors 64, 66, 68 may be arranged circumferentially and centred on the second end of the pump tube 62. For example, the external injectors 68 are arranged circumferentially around the intermediate injectors 66, which are arranged circumferentially around the central injector 64.

The external injectors 68 and the intermediate injectors 66 may be staggered around the second end of the pump tube 62. The external injectors 68 may be arranged in different angular sectors to the angular sectors in which the intermediate injectors 66 are arranged. Of course, the external injectors 68 and the intermediate injectors 66 may be arranged in the same angular sectors.

The intermediate injectors 66 and external injectors 68 may be elbow-shaped. More specifically, the intermediate injectors 66 and external injectors 68 may comprise a first portion 70 extending substantially perpendicularly, i.e. radially, to the second end of the pump tube 62 and a second portion 72 extending substantially parallel to the second end of the pump tube 62.

Figure 5:
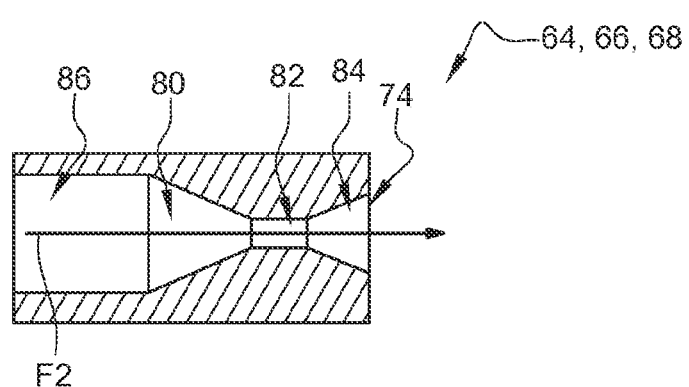
FIG. 5 is a schematic cross-sectional view of one injector of the plurality of injectors of a cooling system according to the invention.

More specifically, FIG. 5 depicts an injector 64, 66, 68.

Each injector 64, 66, 68 comprises an air outlet orifice 74, which is circular in cross-section, as shown in FIG. 4, or oval, or polygonal. The cross-section of the outlet orifices of the injectors 64, 66, 68 may be identical. The cross-section of the outlet orifice 74 of the central injector 64 may be different from that of the intermediate injectors 66 or external injectors 68. The cross-section of the outlet orifices 74 of the intermediate injectors 66 may be different from that of the external injectors 68. The cross-section of an outlet orifice 74 of an intermediate injector 66 may be different from the cross-section of an outlet orifice 74 of another intermediate injector 66. Similarly, the cross-section of an outlet orifice 74 of an external injector 68 may be different from the cross-section of an outlet orifice 74 of another external injector 68.

The external cross-section of the injectors 64, 66 68, i.e. the cross-section of the part of the injectors 64, 66 68 which is in contact with the air of the area near the brakes 42, may be constant along the path of the pressurized air flow F2.

The internal cross-section of the injectors 64, 66, 68, i.e. the cross-section of the part of the injectors 64, 66, 68 which is in contact with the pressurized air flow F2, may vary along the path of the pressurized air flow F2.

The injectors 64, 66, 68 may comprise a first cross-section 80 whose internal diameter decreases along the path of the pressurized air flow F2.

The internal diameter of the first cross-section 80 varies progressively.

Thus, the first cross-section 80 of the injectors 64, 66, 68 has a frustoconical shape. In other words, the first cross-section 80 forms a converging conical part in the direction of the pressurized air flow F2.

The injectors 64, 66, 68 may comprise, for example following the first cross-section 80 in the direction of the flow of the pressurized air flow F2, a second cross-section 82 whose internal diameter is constant along the path of the pressurized air flow F2.

Thus, the second cross-section 82 of the injectors 64, 66, 68 has a cylindrical shape.

The injectors 64, 66, 68 may comprise, for example following the second cross-section 82 in the direction of the flow of the pressurized air flow F2, a third cross-section 84 whose internal diameter increases along the path of the pressurized air flow F2.

The internal diameter of the third cross-section 84 varies progressively.

Thus, the third cross-section 84 of the injectors 64, 66, 68 has a frustoconical shape. In other words, the third cross-section 84 forms a diverging conical part in the direction of the pressurized air flow F2.

The injectors 64, 66, 68 may comprise, for example prior to the first cross-section 80 in the direction of the flow of the pressurized air flow F2, a fourth cross-section 86 whose internal diameter is constant along the path of the pressurized air flow F2.

As shown in FIG. 5, the fourth cross-section 86 may comprise the elbow shape of the intermediate 66 and external 68 injectors.

An injector 64, 66, 68 may be configured to have a restriction of cross-section so as to increase the velocity of the air flow F2. In other words, the cross-section of the injectors 64, 66, 68 may be reduced to transform the high pressure of the pressurized air flow F2 into the high velocity of said pressurized air flow F2.

Figure 6:
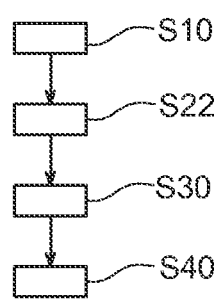
FIG. 6 is a flowchart of the steps of the method for cooling the brakes of a landing gear of a brake system of an aircraft according to the invention.

FIG. 6 shows the steps of the method for cooling the brakes 42 of the landing gear 10 as described above.

The method comprises a step S10 of compressing an air flow so as to generate a pressurized air flow F2. In particular, the compression step S10 is performed by means of the compressor 52, the compressor 52 being in particular an electric compressor. The compression step S10 may be a compression of an air flow so as to generate a low flow rate of air at high pressure.

The method also comprises a step S20 of conveying the pressurized air flow F2 to the area near the brakes 42. In particular, the step S20 of conveying is performed by means of the pump tube 62.

The method comprises a step S30 of injecting the pressurized air flow F2 into the area near the brakes 42. In particular, the injection step S30 is performed by means of said or each injector 64, 66, 68.

The method also comprises a step S40 of sucking the air flow F1 from the area near the brakes 42.

In particular, the injection of the pressurized air flow F2 into the area near the brakes allows a negative pressure to be generated in the area near the brakes 42, which allows the air flow F1 from the brakes to be sucked in.

The invention claimed is:

1. A cooling system for cooling brakes of a brake system of a landing gear of an aircraft, comprising:
   a compressor configured to generate a pressurized air flow, said compressor comprising at least one air outlet, and
   an air jet pump comprising:
      a pump tube comprising a first end connected to said air outlet and a second end, said pump tube being designed to convey said pressurized air flow between the first and second ends, and
      a plurality of injectors connected to said second end of the pump tube, and configured to inject said pressurized air flow,
   wherein the plurality of injectors comprises a central injector arranged as an extension of the second end of the pump tube and a plurality of intermediate injectors arranged 360° around said central injector.

2. The cooling system according to claim 1, wherein each injector has a cross-sectional restriction along a path of the pressurized air flow.

3. The cooling system according to claim 1, wherein the plurality of injectors are arranged circumferentially and centred on the second end of the pump tube.

4. The cooling system according to claim 1, wherein the plurality of injectors comprises a plurality of external injectors arranged 360° around said intermediate injectors.

5. The cooling system according to claim 4, wherein the plurality of external injectors and the plurality of intermediate injectors are arranged in a staggered pattern around the second end of the pump tube.

6. The cooling system according to claim 1, wherein at least one or each injector is elbow shaped.

7. The cooling system according to claim 1, wherein the compressor is an electric compressor.

8. A landing gear of an aircraft comprising:
   at least one wheel;
   a brake system comprising brakes adapted to slow or stop the rotation of said at least one wheel; and
   a cooling system according to claim 1.

9. The landing gear according to claim 8, wherein the compressor of the cooling system is arranged remotely from an area near the brakes.

10. The landing gear according to claim 8, wherein each injector is arranged outside a rim of the wheel.

11. The landing gear according to claim 8, wherein each injector is arranged inside a rim of the wheel.

12. A method for cooling the brakes of a brake system of a landing gear of an aircraft, the landing gear including at least one wheel, a brake system comprising brakes adapted to slow or stop the rotation of said at least one wheel, and a cooling system according to claim 1, the method comprising:
   compressing, by the compressor, an air flow so as to generate a pressurized air flow;
   conveying the pressurized air flow, by the pump tube, to an area near the brakes;
   injecting, by each injector, the pressurized air flow into said area near the brakes; and
   sucking an air flow from said area near the brakes.

* * * * *